May 22, 1951      F. B. QUINLAN      2,554,212
PNEUMATIC VIBRATOR MACHINE
Filed May 29, 1946      2 Sheets-Sheet 1
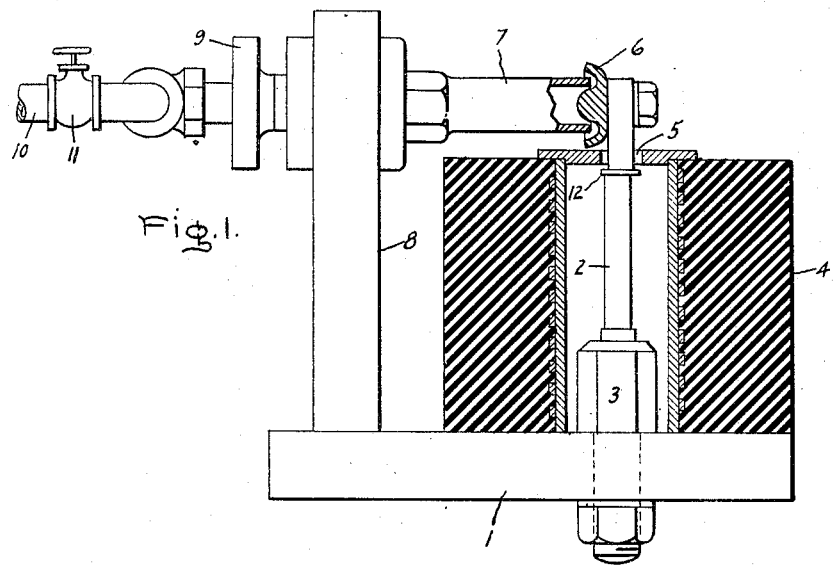
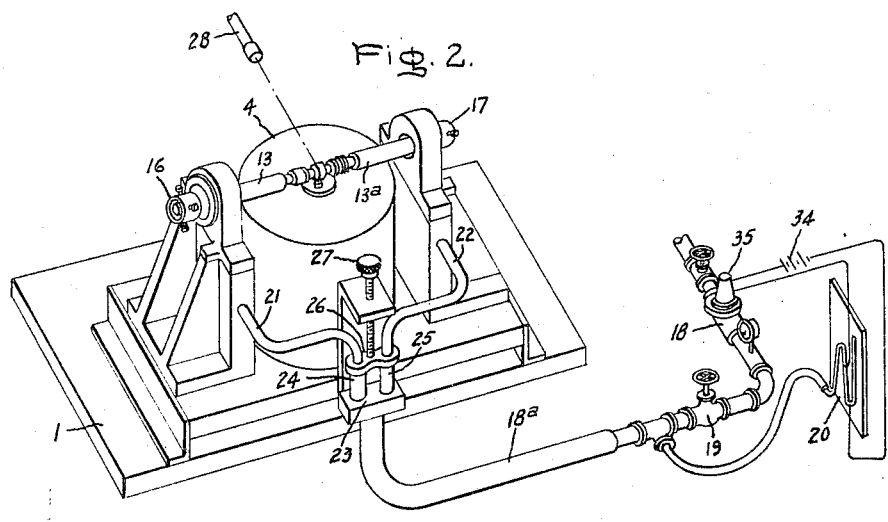
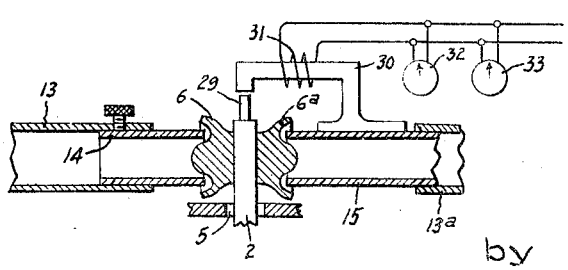
Inventor:
Frank B. Quinlan,
by Browell Mack
His Attorney.

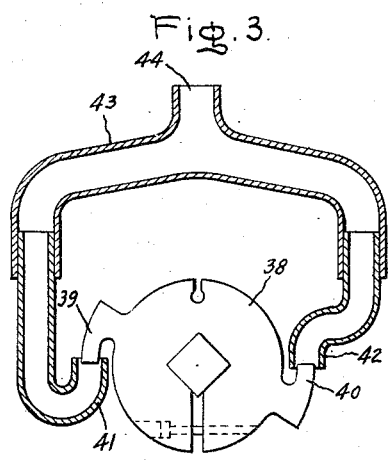
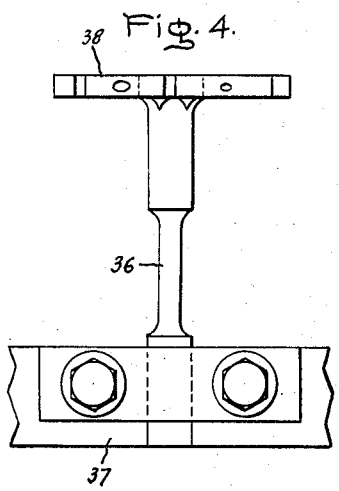
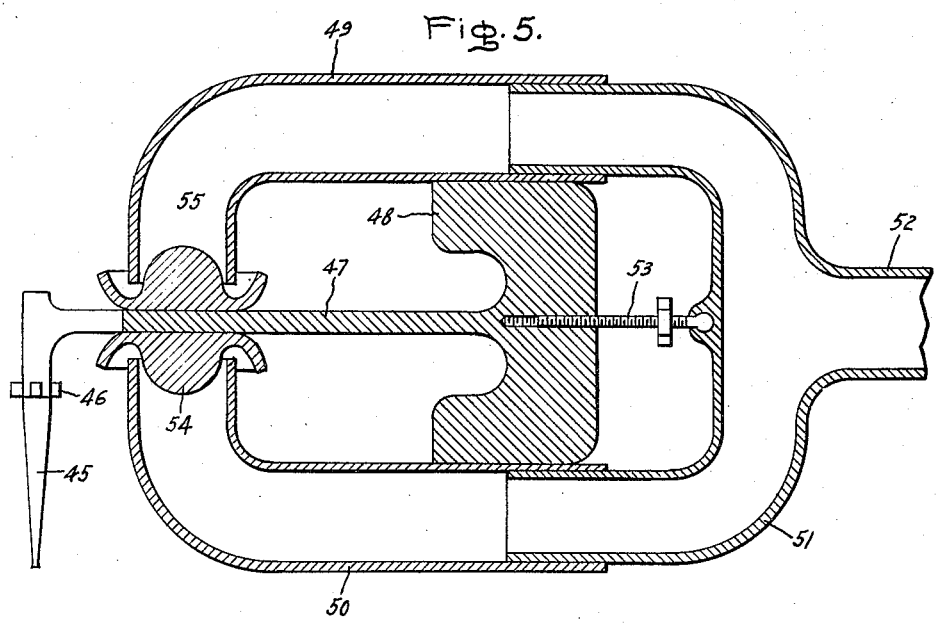
Inventor:
Frank B. Quinlan,
by Purcell S. Mack
His Attorney.

Patented May 22, 1951

2,554,212

UNITED STATES PATENT OFFICE 2,554,212

PNEUMATIC VIBRATOR MACHINE

Frank B. Quinlan, Ballston Lake, N. Y., assignor to General Electric Company, a corporation of New York Application May 29, 1946, Serial No. 673,081

9 Claims. (Cl. 73—67)

My invention relates to pneumatic vibrator machines and its object is to provide important improvements in such machines to improve their efficiency, reduce the noise incident to their operation, and provide for adjustability with respect to the amplitude of vibration. The machine in question was developed for and is particularly useful for vibratory fatigue testing of materials, and its use for this purpose will be explained, but it is to be understood that the invention is not limited to any particular use application.

In carrying my invention into effect, I have found it particularly advantageous to provide pneumatic vibrating machines with one or more pairs of pistons operating on the same vibratory part, with the pistons of a pair connected together through an air supply manifold of such length that there is a synchronous relation between the rate of vibration of the machine and the travel of sound between the pistons of a pair through the manifold, such that the energy of the reacting force impulses produced at one piston by a vibratory force stroke travels to the other piston through the manifold in time to add its energy to the vibratory force stroke of such other piston and vice versa. Utilization of this principle greatly increases the efficiency and at the same time reduces noise and the tendency to set up undesirable and unusable vibrations of various frequencies different from the one being utilized in the operation of the machine. A further increase in efficiency may be obtained by using pistons streamline shaped to substantially completely reverse the direction between supply and exhaust air flow.

The features of my invention which are believed to be novel and patentable will be pointed out in the claims appended hereto. For a better understanding of my invention, reference is made in the following description to the accompanying drawings in which Fig. 1 represents a simple vibrating machine having an improved shape of piston for reversing the direction of supply and exhaust air flow, the machine being illustrated as applied to a vibration fatigue testing machine; Fig. 2 illustrates the general arrangement of a double piston vibratory fatigue testing machine with provisions for tuning of the length of the piston connecting air supply manifold, so that the travel of sound between pistons through such manifold will be equal in time to one-half of a complete cycle of the piston when vibrating at the desired rate; Fig. 2a shows details of the piston of the machine of Fig. 2; Figs. 3 and 4 show different views of portions of a double piston torsion vibrating machine; and Fig. 5 represents a pneumatic hammer embodying my invention.

Referring now to Fig. 1, 1 represents a base to which is clamped a part 2 which may be a piece of metal which it is desired to fatigue test by vibrating its upper end while its bottom end remains substantially fixed. The part 2 may, for example, be a sample bucket of a gas turbine of crescent-shaped cross section and is subject to high speeds and temperatures in operation, and is here fatigue tested to determine its useful safe life under severe conditions of vibration and temperature. The part 2 may be welded or otherwise secured at its lower end to a clamping bolt 3 so that its lower end will be substantially fixed, and it is tested by vibrating its upper end back and forth in a given line at right angles to its vertical axis, such that the body 2 is bent slightly first in one direction and then in the opposite direction by a vibrating machine. The part 2 may be enclosed in an electric or other furnace represented at 4 so that it may be tested at various temperatures. The upper end of the part 2 extends through an opening 5 with sufficient clearance as to permit such upper end to be freely vibrated through the amplitude desired, and such upper end is provided with a piston structure 6 cooperating with an air cylinder 7 to which air or other suitable gas under pressure is conveyed, causing the piston 6 and upper end of part 2 to vibrate. The cylinder part 7 is adjustably secured to a pedestal 8 rising from base 1, and the cylinder will be adjustable relative to the piston part 6 by means of adjustable clamping fixtures indicated at 9, such that the piston and cylinder are properly lined up and have the desired clearance substantially as represented. Compressed air is admitted to the cylinder 7 as by means of a conduit represented at 10, and the volume of air and resulting average air pressure in the cylinder may be regulated as by a valve 11.

When air is admitted to cylinder 7, such air under the resulting pressure escaping from the end outlet port against piston 6 forces the piston 6 to the right, bending part 2, uncovering the open end of the cylinder, relieving the air pressure, and the piston then returns to the left under the resilient spring tension in part 2. This action repeats itself rapidly resulting in the back and forth vibration of the upper end of part 2 at a rate which tends to be equal to that of the natural rate of vibration of the test piece 2 as thus mounted, and at an amplitude depending somewhat upon the average air pressure in cylinder 2. Admitting more air increases the amplitude of vibration. The clearance of the piston in the cylinder should be such that the parts do not quite touch when the piston is at the extremity of its vibration to the left or in the cylinder.

Using parts of a size represented in Fig. 1 and a bucket part 2 of crescent-shaped cross section, the part 2 with the attached piston 6 has a natural frequency of about 250 cycles per second. Stresses were produced up to 80,000 p. s. i. (pounds per square inch) in part 2 at a total amplitude of vibration of 0.20 inch. When testing at low stresses below 20,000 p. s. i., the amplitude control of this single piston machine is poor, the axial position of the cylinder is more critical, and it was found that there was a tendency of the amplitude of vibration to increase and decrease, and repeat this in a fairly rhythmic manner in steps at a low frequency beat note. It was subsequently discovered that this was the result of two frequencies; namely, the resonant frequency of the test piece 2 and the resonant frequency of the air column in the cylinder.

In Fig. 2, I have represented a vibrating machine having two pistons and two cylinders working on the same vibratory resiliently mounted armature member, with a common manifold leading to the two pistons of such length as to make the resonant frequency of the air column therein equal to or substantially equal to the natural frequency of the vibrating part of the machine. When this is done, there is a remarkable gain in efficiency and in quietness and stability of operation as compared to the machine of Fig. 1. Fig. 2 is in effect two machines like that of Fig. 1 operating on a common test piece 2 having two pistons 6 and 6a thereon as shown in Fig. 2a. One machine having piston 6 is used to drive the test piece 2 to the right as in Fig. 1, and the other machine having piston 6a is used to drive the test piece 2 to the left. Thus there is a pneumatic drive pulse every half cycle in Fig. 2 instead of every otoher half cycles as in Fig. 1. The two cylinders 13 and 13a have adjustable extensions 14 and 15 as best shown in Fig. 2a in order to adjust for the desired axial clearance with respect to the pistons 6 and 6a at different amplitudes of vibration, and the axial alignment of the cylinders with respect to the pistons may be adjusted by ball seat adjusting means for that purpose at 16 and 17. For high efficiency it is desirable that the adjacent surfaces of outlet port and piston be symmetrical and axially aligned, as shown, so that air escaping from the port against the piston will produce a force on the piston and armature in the desired direction of vibration and parallel with the normal flow of air with negligible sidethrust force. In operation the vibrating armature action is free as the pistons do not make contact with the cylinder parts. Conduit 18—18a represents the compressed air supply for both cylinders. When air is admitted, the armature immediately starts to vibrate at its natural frequency. The air pressure may be controlled by a valve 19 in such conduit and the pressure used read on a pressure measuring manometer 20. The air supply is piped through a flexible tube section 18a to a common manifold for both cylinders including pipes 21 and 22 and means shown at 23, whereby the length of the manifold between the piston ends of the two machines may be adjusted. The device at 23 may comprise a pair of telescoping cylinders at 24 and 25 generally similar to those shown in cross section in Fig. 5, one cylinder of each pair being fastened to a crosshead 26 and adjustable relative to their telescoping cylinders by means of an adjusting screw 27 to thus enable the length of the manifold 14, 13, 21, 24, 25, 22, 13a and 15 to be adjusted between the pistons at 6 and 6a. This comprises a half wave tuning device for the manifold whereby the time of travel of sound in air from one piston 6 through the manifold to the other piston 6a may be adjusted to be equal to one half cycle of the natural rate of vibration of the test piece 2. The manifold is made approximately of the desired length and then adjusted to exactly the correct length for this purpose while in operation, since the natural rate of vibration of different test piece samples will vary, and also in the same test piece, with variations in temperature. A steady flow of air is admitted to the machine at valve 19 and the machine operates, vibrating the test piece 2 in the desired rectilinear path determined by the mounting arrangement. When the tuning adjustment has been made, the operation may be explained as follows: When the piston head is at the extreme left of its swing with piston 6 substantially closing the mouth of cylinder extension 14, the air pressure in such piston extension is a maximum, or in other words, a pressure pulse is built up at this point due to the sudden impediment to the air flow. At the same time the piston 6 is being pushed toward the right by the air pressure and aided by the stored up spring tension in the test piece 2, the piston head starts movement to the right. Owing to the synchronous relation between the rate of vibration of the test piece 2 and the time of travel of sound in the manifold, the air pressure pulse from 14 starts to travel through the manifold to the now relatively low pressure uncovered open end of piston extension 15 and arrives thereat in the same time that the piston head travelling from its extreme left to its extreme right arrives and substantially closes the outlet of piston extension 15, such that the first mentioned pressure pulse arrives at and strikes piston 6a at the extremity of its swing to the right, and the force of such pressure pulse is added to a second pressure pulse which is simultaneously reaching its maximum in piston extension 15 by the sudden impediment of air flow therefrom. Thus, the pressure pulse arriving at piston 6a from 6 through the manifold arrives at just the right time to do useful work in helping to operate the machine instead of arriving at some other time when it would be wasted or used up in producing specious and unwanted vibrations and noise. By reason of the simultaneous pressure pulses in cylinder extension 15, a third pressure pulse of increased magnitude starts to travel back through the manifold and arrives at piston 6 at the extremity of its swing to the left. Thus the action continues with a maximum utilization of the pressure pulse reactions created by the operation. By such arrangement the efficiency of the machine is very greatly increased over a similar machine in which the manifold is not tuned to the correct length. The noise incident to the operation of the machine is very substantially reduced when properly tuned as described. The operation is much more stable with no variation in vibration rate and amplitude for a given air pressure. The amplitude of vibration may be adjusted by adjusting the operating air pressure by means of the valve at 19.

The machine of Fig. 2 will produce stresses in test piece 2 up to 100,000 p. s. i. and do so on approximately one-fifth the amount of air used in the machine of Fig. 1. When the air pressure impulses are tuned to come at the precise instant that the pistons enter the mouth of their cylinders, the driving force is increased many times. For instance, at an amplitude of vibration producing a stress of 40,000 p. s. i. in the test piece, it is now possible to reduce the operating air pressure as measured at 20 from 20 to 1.1 pounds per square inch.

Part of the improvement in operation noted is of course due to the fact that in Fig. 2 we have two machines like Fig. 1 which operate at both ends of the vibration stroke instead of at one end only. It is reasonable to assume that a machine like Fig. 2 would have double the output of a machine like Fig. 1, if the machine like Fig. 2 was badly out of the tuning adjustment described. Such out-of-tune machine would also not have the smooth, stable, quiet operating characteristics of the tuned machine.

Fig. 2 also shows a furnace 4 substantially enclosing the test piece and by means of which the test piece may be varied in temperature while undergoing tests. A change in temperature of the gas turbine bucket test pieces made of alloy frequently varies their natural rate of vibration. For instance, in going from ambient temperature to 1350 degrees F., the natural frequency may decrease from 250 cycles per second to 210 cycles per second. This necessitates a change in the manifold length between pistons for maximum efficiency operation. The desired manifold length can be calculated as follows: For 250 cycles per second vibration the manifold length should be, $$\tfrac{1}{2} \times \frac{1100 \text{ ft. per second}}{250 \text{ cycles per second}} = 2.2 \text{ ft.}$$

and for 210 cycles per second, $$\tfrac{1}{2} \times \frac{1100}{210} = 2.62 \text{ ft.}$$

1100 ft. per second in the above is the velocity of sound in air.

Another feature which contributes to high efficiency of this type of pneumatic vibrating machine is the shape of the active face of the pistons. Pistons streamline shaped as in Figs. 1 and 2 where the escaping air is turned back outside the piston in approximately the reverse direction in which it flows to the piston within the cylinder increase the efficiency of the machines about 25 per cent over that obtained with a flat faced piston. This shape of piston also directs the exhaust air away from the opening 5 in the furnace. The vibrating machine of my invention has no part to wear out except of course the vibrating armature part 2 which in a fatigue testing machine is tested for the purpose of destruction. Gas turbine buckets are not designed solely from the point of view of making a good vibrating armature, and in a vibrating machine such, for example, as a pneumatic hammer the vibrating armature part would be designed and constructed of a material best adapted for long life operation at normal temperatures.

When the machine is used for fatigue testing it is generally desirable to be able to measure the amplitude and rate of vibration. For measuring the amplitude of vibration, I have shown a telescope 28, Fig. 2, focused on the exposed piston head. The piston head may be seen when it stops at the extremities of its swing in the path of vibration, and the difference in such positions at the two ends of the swing can be readily seen and measured. Suitable calibration marks may be made on the piston head in the telescope field of vision to facilitate such measurement.

For measuring frequency of vibration, I may secure a small permanent magnet 29 on the piston head as shown in Fig. 2a such that it varies the flux in a magnetic circuit 30 when in vibration. A pickup coil 31 is wound on the magnetic circuit and an A.-C. voltage of a frequency equal to or double that of the frequency of vibration will be produced therein, depending on the arrangement. If the magnet 29 produces maximum flux in the magnetic circuit 30 at the center of swing, a double frequency voltage will be produced. If the magnet produces maximum flux in the magnetic circuit at one extremity of its swing and minimum flux at the other extremity, a voltage of the same frequency as the vibration rate will be produced. Such frequency can be measured by a frequency meter indicated at 32. Generally during fatigue testing of metal test parts, I have found that when incipient failure occurs but before there is any complete failure, the natural period of vibration of the test piece decreases. If desired, the frequency meter may be of the recording type, so that a complete record may be obtained and from which the time of test and total number of vibrations producing incipient and complete failure may be ascertained. The total number of vibrations occurring during a test from the time of start until the test piece breaks may also be integrated by use of a cycle counter; for example, a small synchronous motor driven counter energized from pickup coil 31. Such a counter is represented at 33. An amplifier may be used as necessary between the pickup coil and measuring instruments. When a test piece breaks, there is a slight rise in pressure in the conduit 18a on the machine side of pressure control valve 19. The air pressure measuring device 20 may be of the mercury column type and be provided with contacts leading to a source of supply 34 and relay operated valve 35 for shutting off the air supply and stopping the machine when a test piece breaks.

In Figs. 3 and 4 there are shown the essential parts of a torsional vibrating machine. A test piece armature 36, Fig. 4, is clamped at its lower end to a fixed base 37. Its upper end carries a generally circular piston head 38 having diametrically opposite pistons 39 and 40 aligned tangentially with respect to the axis of the test piece and facing in the same direction of rotation as shown in Fig. 3. The pistons 39 and 40 face and cooperate with cylinders 41 and 42 joined by a common manifold 43 to an air supply 44. It is evident that the two torque pulses of the pair of air engines will be in phase. Hence, there will be no sidewise thrust on the test piece 36 but only torsional thrust. The machine will produce torsional vibration at a frequency corresponding to the natural torsional rate of vibration of the test piece assembly, the return movement as distinguished from the thrust movement being due solely to spring tension in the test piece 36. In this arrangement it will be desirable to make the length of the manifold between cylinders such that sound travels from one piston to the other in one complete cycle of the vibration rate as by adjustment at the telescoping parts of the manifold.

The two pressure pulses which occur at the pistons simultaneously will be transmitted toward each other through the manifold simultaneously and, hence, will meet midway and collide, and the resulting pulses produced by such collision will travel back to the pistons to arrive there in phase with the next torque pulses. It would be equally valid to consider that the reaction pressure pulses pass each other and arrive at the opposite pistons in phase with the next torque pulses. Whatever pressure pulses result from the reaction of the air on the pistons during the pressure strokes are utilized and not wasted by thus synchronizing the reaction pulses with the next succeeding pressure pulses. Using a test piece in Fig. 3 one-half inch in diameter and 2½ inches long, represented by the reduced section part 36, the natural period of torsional vibration is 230 cycles per second. It is of course obvious that another pair of pistons and cylinders could be added to Fig. 3 for producing torque pulses in the opposite direction of rotation in which case the manifold connection between the engines for opposite directions of rotation would have a length through which sound would travel in one half cycle of the vibrating cycle of the machine as in Fig. 2.

In Fig. 5 there is represented a vibrator machine embodying my invention as applied for vibrating a tool represented at 45. The vibrator head may have a tool holder chuck indicated at 46 which will permit the tool used to be changed. The vibrating machine is represented in cross section. The armature 47 is secured to a base part 48 to which the cylinder portions 49 and 50 of the manifold system are also secured. The part 51 of the manifold connects the two cylinders together and to the air supply 52 and is adjustable to tune the manifold to the desired manifold length between the pistons by an adjusting screw 53 threaded into base part 48 and rotatively secured to manifold part 51. Some adjustment of the length of the manifold may be needed for the desired resonating condition when tools are changed, as one tool may be lighter or heavier than another and this will change the natural period of vibration of the machine. The pistons are represented at 54 and 55 and are of the preferred streamlined reversing flow type previously described. They allow full freedom of the armature and do not come into contact with the stationary cylinder parts in operation.

Where very small test strips are to be fatigue tested at high frequency, the attaching of specially shaped piston parts may make the armature too heavy. In such cases the vibrating end surfaces of the test strip itself may serve as its own pistons. For instance, the machine of Fig. 2a would be operative if the pistons 6 and 6a were removed and the piston mouths extended close to the flat surfaced test piece 2. Removal of the piston parts would increase the natural rate of vibration of the armature 2. The change would also lengthen the manifold appreciably. These changes would require substantial reduction in the length of the manifold by adjustment of the manifold tuning device at 23, or redesign of the machine with a reduced length of manifold to bring it within the desired resonating tuning range.

What I claim as new and desire to secure by Letters Patent of the United States is:

1. A pneumatic vibrating machine comprising an armature part resiliently mounted so as to permit of its vibration in a given path, said part having a pair of pistons, a pair of cylinders having outlet ports closely adjacent and facing said pistons and means for supplying the cylinders with compressed gas such that gas escaping from the cylinder ports tends to move the vibratory armature part, one of said cylinders and pistons serving to move the armature part in one direction and the other cylinder and piston serving to move the armature part in the opposite direction in its path of vibration, said pistons tending to open and close their cylinder ports as they move away from and approach said ports, there being sufficient clearance between a port and its cylinder to permit intended vibration of the armature part without contact between the pistons and cylinders.

2. A pneumatic vibrating machine comprising an armature which is resiliently mounted so as to permit of its vibration in a given path, said armature having a pair of pistons, a pair of cylinders positioned closely adjacent said armature having outlet ports facing said pistons, a common manifold for supplying compressed air to both of said cylinders, whereby air escapes from said ports against said pistons, one cylinder and piston serving to drive the armature in one direction and the other cylinder and piston serving to drive the armature in the opposite direction in its intended path of vibration, said pistons tending to open their cylinder ports when moving away therefrom and to close the same when approaching thereto, the length of the air path in the manifold between the ports of the pair of cylinders being such that sound will travel therethrough in the same time as that of one half cycle of the natural period of vibration of said armature.

3. A pneumatic vibrating machine comprising a resilient armature member fixed at one end and with its other end free to vibrate, said armature member having oppositely facing piston surfaces on its free end, a pair of stationary cylinders having outlet ports adjacent the piston surfaces of said armature member and in close proximity thereto, means for conveying a steady flow of compressed air to said cylinders whereby air escapes from the ports against the piston surfaces and causes the armature to vibrate and thereby causing alternate partial closing and opening of the cylinder ports with a corresponding increase and decrease in the air pressure in such cylinders and an alternate driving action of the armature member in opposite directions at a rate corresponding to its natural rate of vibration, means for varying the air flow to the cylinders for the purpose of varying the amplitude of armature vibration, the piston surfaces of the armature and outlet ports of the cylinders having such clearance as to permit the free vibration of said armature without contact, and means whereby such clearance may be adjusted.

4. A pneumatic vibrating machine comprising an armature member which is resiliently mounted so as to permit at least a portion thereof to vibrate in a desired path, said armature member having at least two piston surfaces, cylinders having outlet ports closely adjacent the piston surfaces of said armature member, a common manifold connecting said cylinders and means for conveying compressed air to said cylinders through such manifold whereby air escapes from the outlet ports against the piston surfaces of the armature in a manner to cause the armature to vibrate in the desired path at the natural vibration rate of said armature as mounted and such that as a piston surface moves away from and returns toward the adjacent cylinder outlet port, outlet port opening and closing action occurs resulting in a decrease and increase in air pressure in the corresponding cylinder, and means for adjusting the length of the manifold between the outlet ports of said cylinders so that sound will travel through the air in the manifold between the two outlet ports in a time period equal to the time period between consecutive outlet port opening actions at the two cylinders when the armature is vibrating at its natural rate.

5. In a pneumatic vibrating machine, an armature member mounted to permit vibration in a desired path, a piston member carried by a vibratory part of said armature member and a cylinder having an outlet port closely adjacent to and symmetrically facing said piston member, said armature and piston members having a path of movement directly towards and away from said outlet port, means for conveying compressed air into said cylinder whereby it escapes from the outlet port against the piston surface in a direction parallel with the path of movement of the piston and causes a driving action on the armature member in one direction of the desired vibration directly away from said outlet port and in line with the direction of air flow therethrough, the piston surface being shaped to produce a symmetrically streamlined substantial reversal of the direction of flow of air as it strikes against and leaves the piston surface in escaping from the outlet port during an armature driving action, said piston surface and outlet port having sufficient clearance as to prevent actual contact between the two in normal operation.

6. A pneumatic vibrating machine comprising a resilient armature member fixed at one end with its other end free to vibrate in a desired rectilinear path, a pair of pistons carried by the free end of said armature member facing in opposite directions in said rectilinear path, a pair of cylinders having outlet ports facing and closely adjacent said pistons, a manifold connecting said two cylinders, a compressed air supply, means for admitting a steady but adjustable flow of air from such supply to the manifold whereby air escapes from the outlet ports against the pistons and tends to drive the armature in the opposite directions of the desired vibration and resulting in such vibration accompanied by alternate partial opening and closing of the outlet ports by the adjacent pistons with a resulting alternate decrease and increase of air pressure in the corresponding cylinders, said pistons being shaped to produce a streamlined substantial reversal of the direction of air flow as it leaves the outlet ports, strikes the pistons and escapes in the open air, means for adjusting the length of the manifold between outlet ports such that a pressure pulse in one cylinder caused by the port closing action of the adjacent piston arrives at the other piston simultaneously with its port closing action when the armature is vibrating at its natural rate, and means for adjusting the clearance and alignment of pistons and cylinders so that the armature member vibrates freely without contact between cylinder outlet opening surfaces and pistons.

7. A pneumatic torsional vibrating machine comprising an armature member resiliently mounted so as to permit torsional vibration about a given axis, said armature member having a piston head carrying pistons at diametrically opposite points outside of the axis of rotation and equally distant therefrom, and facing tangentially in the same direction of rotation about such axis, a pair of cylinders having outlet ports closely adjacent and facing said pistons, a manifold connecting said cylinders, a compressed air supply communicating with said manifold whereby air escapes from the outlet ports against the pistons and produces rotary driving action on the armature member in a given direction about said given axis, whereby the armature is rotated in said direction, said action tending to open the outlet ports reducing the air pressure in the cylinders and decreasing the rotary driving force, the resilient mounting of said armature member then causing an opposite rotation and a reclosing action of the outlet ports, whereby the armature member is set into torsional vibration at its natural rate of vibration, the length of manifold between cylinder outlets being such that sound will travel in the air therethrough from one outlet port to the other in one cycle of vibration of the armature.

8. A pneumatic vibrating machine comprising an elongated armature member, a substantial portion of which comprises a test part to be fatigue tested by vibration, said armature having one end fixed and the other end free to vibrate, such vibration being permitted by reason of the resiliency of such test part, the free end of said armature having at least one piston surface, a cylinder having an outlet port closely adjacent to and facing the piston surface of said armature, means whereby an adjustable amount of compressed air may be admitted to said cylinder such that air will escape from said outlet port against said piston surface producing a driving action on the armature member, the adjacent surfaces of outlet port and piston being symmetrical and in axial alignment in the direction of desired vibration such that air escaping from said port against such piston surfaces produces a force on the piston and armature parallel with the desired direction of vibration with negligible sidethrust, whereby the armature member is flexed by such driving force in one direction and results in an opening action of the outlet port and a resulting decrease in pressure in the cylinder and in the driving force, a return of the armature member in the opposite direction, a closing action of the outlet port and repetition of the above actions with the armature vibrating at its natural rate, means for measuring the average air pressure admitted to said cylinder, means for measuring the amplitude of vibration of said armature member, and means for measuring the frequency and number of vibrations of said armature member.

9. A pneumatic vibrating machine comprising an elongated resilient armature member fixed at one end and with its other end free to vibrate, a substantial portion of said armature member comprising a test piece to be fatigue tested by vibration, a pair of air engines for vibrating said armature having pistons on said armature and stationary cylinders with outlet openings closely adjacent to and facing said pistons and oriented to produce driving forces on the armature in alignment with the desired path of vibration, a compressed air supply, conduit means including a control valve for admitting an adjustable amount of air to said cylinders thereby causing the vibration of said armature at an amplitude dependent on the air supply pressure and at a rate determined by the natural rate of vibration of the armature member, the air pressure on the cylinder side of said air valve being different, for a given adjustment of said valve and air pressure supply, when the machine is in normal operation than when the armature is prevented from vibration, and means responsive to the change in air pressure on the cylinder side of said valve for automatically cutting off the air supply in case the armature fails while the machine is in normal operation.

FRANK B. QUINLAN.

REFERENCES CITED

The following references are of record in the file of this patent:

UNITED STATES PATENTS

| Number | Name | Date |
|---|---|---|
| 1,635,787 | Hort | July 12, 1927 |
| 2,111,036 | Wippel | Mar. 15, 1938 |
| 2,452,031 | Allnutt et al. | Oct. 26, 1948 |